United States Patent Office 3,641,091
Patented Feb. 8, 1972

3,641,091
METHOD OF PREPARING DISUBSTITUTED
DI(p-ARYLAMINOPHENOXY) SILANES
Leonid Alexandrovich Skripko, Ulitsa Michurinskaya 143, kv. 97, Tambov, U.S.S.R.; Eduard Grigorievich Rozantsev, 2 Baltysky pereulok 2, kv. 10, Moscow, U.S.S.R.; and Lidia Grigorievna Polotovskaya, Poselok khiminstituta 10, kv. 15, Kalinin, U.S.S.R.
No Drawing. Filed Nov. 18, 1970, Ser. No. 90,868
Int. Cl. C07f 7/04, 7/18
U.S. Cl. 260—448.8 R 9 Claims

ABSTRACT OF THE DISCLOSURE

A method of preparing disubstituted di(p-arylaminophenoxy)silanes by the reaction of p-hydroxyarylamines with disubstituted dichlorosilanes in an inert organic solvent medium and subsequent reaction with ammonia which acts as an acceptor of hydrogen chloride which is given off during the reaction.

Disubstituted di(p-arylaminophenoxy)silanes are effective stabilizers for polypropylene, impact resistant polystyrene, polyamides, homopolymers and copolymers of formaldehyde, polyolefines, a copolymer of tetrahydrofurane and propylene oxide and pentaplast.

---

The present invention relates to the synthesis of organosilicon compounds and, more particularly, disubstituted di(p-arylamino-phenoxy)silanes, which may be used as stabilizers in the production of different kinds of polymeric materials.

In U.S.S.R. Inventor's Certificate No. 202,949 (1967) there is described a method for preparing a compound of this class for the first time, namely dimethyl-di(p-phenylaminophenoxy)silane, which consists in adding a solution of triethylamine to a benzene solution of p-hydroxydiphenylamine followed by the addition of dimethyldichlorosilane at a temperature of 20° C. and boiling the mixture obtained for a period of 4 hours. Afterwards, the reaction mixture is cooled and triethylamine hydrochloride is filtered off.

After distilling off the benzene, the final product which is in the form of a brown liquid is poured into a crystallizing vessel and crystallized. The product obtained is recrystallized from a large volume of cyclohexane.

The yield of dimethyldi(p-phenylaminophenoxy)silane was 77.8–82.9% of theory, based on the starting material, hydroxydiphenylamine, M.P. 103°–104° C.

The preparation of disubstituted di(p-arylaminophenoxy)silanes according to the method mentioned, may be represented in the following way:

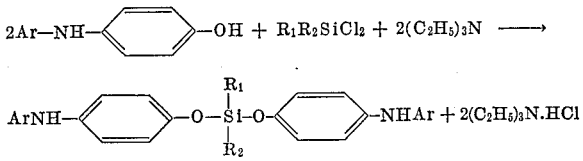

where:
Ar is a substituted or unsubstituted aryl group $R_1$, $R_2$ is alkyl or aryl.

The hydrogen chloride formed in the reaction is absorbed by the triethylamine with the formation of triethylamine hydrochloride.

This method of preparing disubstituted di(p-arylaminophenoxy)silanes and in particular dimethyldi(p-phenylaminophenoxy)silane has a number of serious disadvantages. The hydrogen chloride acceptor triethylamine is extensively oxidized in the benzene solution of p-hydroxy-diphenylamine, which results in a poor quality product after it is isolated. Also, there takes place a side reaction between triethylamine and the disubstituted dichlorosilane, which impairs the quality of the end product.

The end product is purified by a many staged, laborious series of operations which are not practical; because of this, it was difficult to use this process industrially.

During the regeneration of triethylamine from triethylamine hydrochloride, which is formed as a by-product in the reaction, a large quantity of waste water is formed which is difficult to purify.

An object of the present invention is to improve the above process, and in particular, to find a more effective hydrogen chloride acceptor, which will not react with the starting materials and which would enable one to carry out the production of disubstituted di(p-arylaminophenoxy)silanes on an industrial scale.

Other objects of the present invention are: simplification of the processing stages for producing and isolating the end products, decreasing the production time, and preventing the formation of large quantities of waste water.

With these objects in view, we developed a synthesis of disubstituted di(p-arylaminophenoxy)silanes, which is characterized in that the condensation of p-hydroxyarylamine with disubstituted dichlorosilanes is carried out in the molar proportions, in the range of 2:1 to 2:1.5 in an organic solvent medium inert to the starting materials, with the formation of di(p-arylaminophenoxy)silane hydrochlorides. The latter is treated with a quantity of ammonia which is sufficient to react with all the hydrogen chloride in the salt. The process is carried out at a temperature of 10–80° C. at atmospheric pressure.

A practical method for the preparation of disubstituted di(p-arylaminophenoxy)silanes is carried out in the following way: to a solution of p-hydroxydiphenylamine in an inert organic solvent (benzene, toluene) there is added a disubstituted dichlorosilane in the molar ratios of from 2:1 to 2:1,5, preferably of from 2:1 to 2:1.2. In this way, the di(p-arylaminophenoxy)silane precipitates as the hydrochloride salt.

Gaseous ammonia is introduced into the reaction mixture until the hydrochloride salt of the di(arylaminophenoxy)-silane is converted into di(p-arylaminophenxy)silane which passes into solution of the inert organic solvent. The precipitated ammonium chloride is filtered off and washed on the filter with the same organic solvent.

The solvent is distilled off the mother liquor. The product, appearing in the form of a light brown mobile liquid, is poured into isopropyl alcohol, upon which the end product precipitates as a crystalline powder. The latter is filtered off and recrystallized from a small quantity of isopropyl alcohol.

The preparation of disubstituted di-(p-arylaminophenoxy)silanes according to the present method may be represented by the following equations:

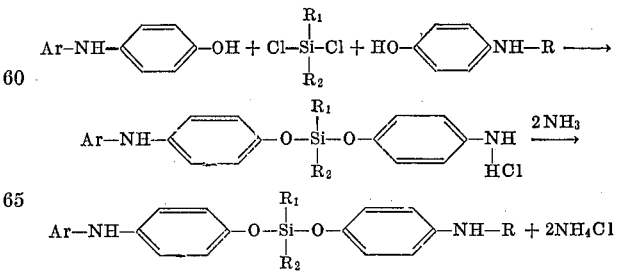

where:
Ar is substituted or unsubstituted aryl groups R, $R_1$, $R_2$ is alkyl or aryl.

According to the above scheme there were obtained new compounds which have not been described in the literature:

dimethyl di (p-betanaphthylaminophenoxy) silane,
diphenyl di(phenylaminophenoxy)silane,
methyl, phenyl di(p-phenylaminophenoxy)silane, and
dimethyl di (p-anisylaminophenoxy)silane.

Further, according to this scheme there may be obtained the following compounds:

diphenyl di(p-anisylaminophenoxy)silane,
diethoxy di(p-anisylaminophenoxy)silane,
dimethyl di(p-tolylaminophenoxy)silane,
diphenyl di(p-tolylaminophenoxy)silane,
methylethoxy di(p-tolylaminophenoxy)silane,
phenylethoxy di(p-phenethylaminophenoxy)silane,
diphenyl di(p-biphenylaminophenoxy)silane,
dimethyl di(p-phenoxyaminoxy)silane,
dimethyl di(p-dimethylaminophenylaminophenoxy)silane,
diethyl di(p-beta-naphthylaminophenoxy)silane,
diphenyl di(p-beta naphthylaminophenoxy)silane,
diphenyl di(p-isopropylaminophenylaminophenoxy)silane.

The product dimethyl di(p-beta-naphthylaminophenoxy)silane is a more effective thermostabilizer for pentoplast than neozene D, di-beta-naphthyl-p phenylenediamine or 2,2¹-thio bis(4-methyl-6-tertbutylphenol).

Pentaplast, stabilized with dimethyl di(p-beta-anaphthylaminophenoxy)silane at a temperature of 190° (close to the working temperature) for a period of eight hours retained its original properties; also its viscosity index does not change.

A synergistic mixture consisting of diphenyl di(p-phenylaminophenoxy)silane and dilaurylthiodipropionate or di-arylalkylphosphite is effective for the thermal stabilization of polyolefines. By itself, the product diphenyl di(p-phenylaminophenoxy)silane is an effective antioxidant for polyformaldehyde polymers (high molecular weight polyoxymethylene diacetate, copolymers of formaldehyde with ethylene oxide, or dioxalane).

The new method of preparing di(p-arylaminophenoxy) silanes has the following advantage: it prevents the oxidation of the reaction mixture.

The above described order, in charging the reagents, makes it possible to carry out the reaction in the presence of hydrogen chloride which prevents the oxidation of the reaction mixture; using the above described order in charging the reagents also prevents the reaction of disubstituted dichlorsilane with the hydrogen chloride acceptor—ammonia.

It is not necessary to carry out the process at the boiling of the reaction mixture, which therefore decreases the energy expenditure. The separation of the end product is not difficult to carry out on an industrial scale.

There is a significant improvement in the quality of the end product; for example in the case of dimethyl di(p-phenylaminophenoxy)silane the melting point is raised from 103–104° to 106–107° C. with the yield remaining at 80%.

An important advantage of the above method is the prevention of the formation of large quantities of waste water.

The ammonium chloride which is formed as a by-product, after washing with acetone, may be used for various industrial purposes.

In the synthesis of di-substituted di(arylaminophenoxy) silanes, there may be used the following types of starting material: p-hydroxydiphenylamine, p-hydroxyphenyl-beta-naphthylamine, 4-hydroxy-4¹-methoxydiphenylamine, dimethyldichlorosilane, diphenyldichlorosilane, methylphenyldichlorosilane, and diethyldichlorosilane. Preferably, p-hydroxyarylamines are used in a chemically pure form, but the disubstituted dichlorosilanes may be used in their technical form.

The end products obtained on the basis of the above raw materials are either white to rose colored crystalline compounds or viscous oily liquids.

For a better understanding of the present invention there are given detailed examples for carrying out the method.

EXAMPLE 1.—THE PREPARATION OF DIMETHYL-DI(P-PHENYLAMINOPHENOXY) SILANE

To a three necked 1 liter flask equipped with a stirrer, reflux condenser, thermometer and dropping funnel, there is charged 111.14 g. (0.6 gram-mole) of p-hydroxydiphenylamine, distilled in vacuum, and 400 ml. benzene.

After dissolving the p-hydroxydiphenylamine there is added 36.18 ml. (0.3 gram-mole) of dimethyldichlorosilane. As the dimethyldichlorosilane is added, a precipitate of the dimethyldi(p-phenylaminophenoxy)silane hydrochloride falls out in the reaction mixture.

After 10–15 minutes, at room temperature, gaseous ammonia is passed through the reaction mixture layer until free ammonia is observed using universal indicator paper and until no more dimethyldi(p-phenylaminophenoxy) silane is seen in the reaction mixture.

The reaction mass is kept at room temperature for a period of one hour and the precipitated ammonium chloride is filtered off and worked with 200 ml. of benzene.

The benzene is distilled off on a water bath (from the mother liquor) at atmosphere pressure, and then under vaccum. The benzene that is distilled off may be used in the following preparations as solvent.

The final product, which is in the form of a light brown mobile liquid is poured with mixing into 140 ml. of anhydrous isopropyl alcohol, cooled to 15° C.; whereupon the desired product precipitates immediately in the form of a crystalline powder. The crystals in isopropyl alcohol are cooled to 10° C., filtered, and washed with 150 ml. of cooled isopropyl alcohol.

The product obtained is recrystallized from 150 ml. of anhydrous isopropyl alcohol, the precipitated crystals are filtered off, and washed on the filter with 150 ml. of cooled isopropyl alcohol.

There is obtained 106 g. of dimethyldi(p-phenylaminophenoxy)silane which amounts to a yield of 83% of theory, based on p-hydroxydiphenylamine. The product is in the form of a white crystalline powder with M.P. 106°–107° C.

Dimethyldi(p-phenylaminophenoxy)silane readily dissolves in acetone, benzene, toluene, ether, chloroform, ethyl acetate, chlorobenzene, dimethylformamide; on heating it dissolves in alcohol, cyclohexane, carbon tetrachloride and dibutyl ether. It is insoluble in water, hexane, dilute acids and alkalies.

EXAMPLE 2.—THE PREPARATION OF DIMETHYL-DI(P - BETA - NAPHTHYLAMINOPHENOXY)SILANE

To a three-necked 1 liter flask, equipped with a stirrer reflux condenser, thermometer and dropping funnel, there is charged 117.64 gr. (0.5 gr. mol) p-hydroxydiphenyl-beta-naphthylamine, distilled under vacuum, and 650 ml. benzene. To the suspension of p-hydroxyphenyl-beta-naphthylamine in benzene there is added 30.15 ml. (0.25 gr. mol) of dimethyldichlorosilane over a one hour period.

After 20–30 minutes, gaseous ammonia is passed through the reaction mixture, the gas entering at the bottom of the reaction layer. The ammonia is added at room temperature until all the hydrogen chloride is completely neutralized which is checked with an indicator.

The reaction mass is filtered from the precipitated ammonium chloride, and washed on the filter with 500 ml. of warm benzene.

The benzene is distilled off on a water bath, at first at atmospheric pressure, and then under vacuum. The benzene that is distilled off is used as a solvent in the following reaction.

The residue which is in the form of a brown, oily liquid is treated with 250 ml. isopropyl alcohol, whereupon the end product immediately precipitates in a crystalline state. The suspension in isopropyl alcohol is cooled to 15° C., filtered and washed on the filter with 400 ml. of chilled isopropyl alcohol.

There is obtained 104.8 g. dimethyldi(p-beta-naphthyl-aminophenoxy)silane, in 79.2% yield of theory based on p-hydroxyphenyl-beta-naphthylamine.

The product is in the form of a light rose powder with M.P. 137°–138° C. After recrystallization from a mixture of chlorobenzene and isopropyl alcohol (1:1), the crystals have an M.P. 139°–140° C.

Dimethyldi(p - beta - naphthylaminophenoxy)silane is readily soluble in acetone, chloroform, ethyl acetate, and dimethylformamide and it dissolves on heating in benzene, and chlorobenzene. It is poorly soluble in alcohols, and insoluble in water, hexane, dilute acids and alkalies.

*Analysis.*—Calculated for $C_{34}H_{30}N_2O_2Si$ (percent): C, 77.53; H, 5.74; N, 5.32; Si, 5.33. Found (percent): C, 77.69; H, 5.99; N, 5.23; Si, 5.23.

Dimethyldi(p-beta-naphthylaminophenoxy)silane is a more effective thermostabilizer for pentaplast than either phenyl-beta-naphthylamine or 2,2'-thio-bis-(4-methyl-6-tert-butylphenol).

The stabilizer is introduced into the polymer as a solution in the proportion of 0.01 mole/kg.

Pentaplast stabilized with dimethyldi(p-beta-naphthyl-aminophenoxy)silane retains its original properties almost completely after being maintained at a temperature of 190° (close to the processing temperature) for eight hours. On the other hand, heating pentaplast stabilized with one of the well-known additives described above under the same conditions caused degradation of the polymer.

EXAMPLE 3.—THE PREPARATION OF DIPHENYL-DI(P-PHENYLAMINOPHENOXY)SILANE

Analogously to the conditions of Example 1, starting with 37.04 gr. (0.2 gr.-mole) p-hydroxydiphenylamine, 20.72 ml. (0.1 gr. mol) diphenyldichlorsilane, and ammonia in a toluene medium, there is obtained 48.2 g. diphenyldi(p-phenylaminophenoxy)silane, which amounts to an 87.5% yield of theory, based on p-hydroxydiphenylamine. The end product is in the form of a white crystalline powder, M.P. 104°–105° C.

Diphenyldi(p - phenylaminophenoxy)silane is readily soluble in acetone, benzene, toluene, ether, chloroform and ethyl acetate. It dissolves on heating in alcohols, cyclohexane and carbon tetrachloride. It is insoluble in water, dilute acids and alkalies.

*Analysis.*—Calculated for $C_{36}H_{30}N_2O_2Si$ (percent): C, 78.53; H, 5.49; N, 5.09; Si, 5.10. Found (percent): C, 78.43; H, 5.70; N, 5.28; Si, 5.19.

The U.V. spectrum showed a maximum at $\lambda_{max}=280$ m$\mu$, E=37,450 (ethanol).

The synergistic mixture of diphenyldi(p-phenylamino-phenoxy)silane with dilaurylthiodipropionate has found an application as a thermo stabilizer in polyolefines. With a total 0.95% concentration of diphenyldi(p-phenylamino-phenoxy)silane and dilauryl-thio-dipropionate, the induction period is almost 9 hours, the polymer retaining its original appearance.

Diphenyldi(p-phenylaminophenoxy)silane has found application as an antioxidant for formaldehyde polymers (high molecular weight polyoxymethylene, its diacetate; copolymer of formaldehyde with ethylene oxide, or dioxalane). Whereas the induction period using as stabilizer 2,2'-methylene bis-4-methyl-6 tert butylphenol in this polymer is 30 minutes, under the same conditions using diphenyldi(p-phenylaminophenoxy)silane the induction period is five hours.

EXAMPLE 4.—THE PREPARATION OF METHYL-PHENYLDI(P-PHENYLAMINOPHENOXY)SILANE

Analogously to the conditions of Example 1, starting with 111.14 gr. (0.6 gr. mole) p-hydroxydiphenylamine, 48.6 ml. (0.3 gr. mole) methylphenyldichlorosilane and ammonia in a benzene medium there is obtained 86 gr. methylphenyldi(p - phenylaminophenoxy)silane which amounts to 68.9% of theory, based on p-hydroxydiphenylamine.

The end product was in the form of a viscous, oily, amber colored liquid B.P. 318°–320° C. at 1 mm. Hg.

EXAMPLE 5.—THE PREPARATION OF DIMETHYL-DI(P-ANISYLAMINOPHENOXY)SILANE

Analogously to the conditions of Example 1, starting with 43.05 gr. (0.2 gr. mole) 4-hydroxy-4'-methoxy-diphenylamine 14.46 ml. (0.12 gr. mole) dimethyldichlorosilane and ammonia in a benzene medium there was obtained 86 gr. of methylphenyldi(p-methoxy-phenylamino-phenoxy)silane, which amounts to an 88% yield of theory, based on 4-hydroxy-4'-methoxydiphenylamine. The end product is in the form of a viscous, oily amber colored liquid B.P./1 mm. 310°–312° C.; $n_D^{20}=1.6245$.

What is claimed is:
1. A method of preparing disubstituted di(p-arylamino-phenoxy)silanes which comprises condensing a p-hydroxy-diarylamine with a disubstituted dichlorosilane in the molar proportions of from 2:1 to 2:1.5 in an organic solvent medium inert to the starting reagents, with the formation of the hydrochloride salts of disubstituted di(p-arylaminophenoxy)silane followed by treatment with ammonia, used in a quantity necessary for the complete reaction of the hydrogen chloride, which is split off, and separation of the end product from the organic solvent.

2. A method according to claim 1, in which the process is carried out with a molar proportion of p-hydroxy-arylamine to disubstituted dichlorosilane of 2:1.2.

3. A method according to claim 1, in which the organic solvent used is benzene.

4. A method according to claim 1, in which the organic solvent used is toluene.

5. A method according to claim 1, in which there is used a p-hydroxyarylamine of the general formula

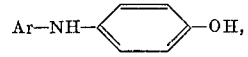

where Ar is chosen from the group, consisting of phenyl, naphthyl and alkoxyphenyl.

6. A method according to claim 1, in which there is used a disubstituted dichlorosilane of the general formula $R_1R_2SiCl_2$, where $R_1$ and $R_2$ are chosen from the group consisting of methyl phenyl.

7. Dimethyldi(p-beta-naphthylaminophenoxy)silane.

8. Diphenyldi(p-phenylaminophenoxy)silane.

9. Dimethyldi(p-anisylaminophenoxy)silane.

References Cited

UNITED STATES PATENTS

| | | | |
|---|---|---|---|
| 2,611,778 | 9/1952 | Speier | 260—448.8 R |
| 2,818,389 | 12/1957 | Da Fano et al. | 260—448.8 RX |

JAMES E. POER, Primary Examiner

P. F. SHAVER, Assistant Examiner